(12) United States Patent
Waddleton

(10) Patent No.: US 10,501,169 B2
(45) Date of Patent: Dec. 10, 2019

(54) PROPELLER BLADE ANGLE CONTROL SYSTEM

(71) Applicant: Pratt & Whitney Canada Corp., Longueuil (CA)

(72) Inventor: David Waddleton, Candiac (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 380 days.

(21) Appl. No.: 15/185,539

(22) Filed: Jun. 17, 2016

(65) Prior Publication Data

US 2017/0361919 A1   Dec. 21, 2017

(51) Int. Cl.
*B64C 11/38* (2006.01)
*F04D 29/063* (2006.01)
(Continued)

(52) U.S. Cl.
CPC ............ *B64C 11/38* (2013.01); *B64C 11/385* (2013.01); *B64C 27/64* (2013.01); *F04D 29/063* (2013.01);
(Continued)

(58) Field of Classification Search
CPC .... F04D 29/063; F04D 29/325; F04D 29/362; F04D 29/582; F16K 17/22; F16K 17/24; F16K 17/28; F16K 17/30; F16K 31/1221; G05D 7/0126; G05D 7/0133; G05D 7/014; G05D 116/10; G05D 116/103; G05D 116/106; B64C 11/38; B64C 11/385;
(Continued)

(56) References Cited

U.S. PATENT DOCUMENTS 2,840,171 A * 6/1958 Jedrziewski .......... B64C 11/385
                                                                416/36
2,891,627 A   6/1959 Ditmer et al.
(Continued)

FOREIGN PATENT DOCUMENTS

FR            3013386           5/2015

OTHER PUBLICATIONS

Borg-Warner Corporation; accessed Jun. 8, 2018; Pesco Catalog 1960's, p. 13; https://www.thermoelectric.com/2010/archives/library.htm.*

(Continued)

*Primary Examiner* — Justin D Seabe
*Assistant Examiner* — Joshua R Beebe
(74) *Attorney, Agent, or Firm* — Norton Rose Fulbright Canada

(57) ABSTRACT

A control circuit for changing the angle of propeller blades includes a propeller control unit controlling a supply of oil to modify an angle of propeller blades, and a fixed-displacement pump providing the supply of oil from an engine oil return system to the propeller control unit. An oil cooling line extends between an outlet of the pump and the engine oil return system. The oil cooling line defines an oil leakage path leading to the engine oil return system for cooling the oil. A flow regulator between the pump and the propeller control unit is operable between an open position where oil is directed through the oil cooling line to the engine oil return system for cooling the oil, and a closed position blocking the oil cooling line and directing oil toward the propeller control unit to modify the angle of the propeller blades.

20 Claims, 6 Drawing Sheets

(51) Int. Cl.
*F04D 29/32* (2006.01)
*F04D 29/36* (2006.01)
*F04D 29/58* (2006.01)
*B64C 27/64* (2006.01)
*F15B 21/042* (2019.01)

(52) U.S. Cl.
CPC ......... *F04D 29/325* (2013.01); *F04D 29/362* (2013.01); *F04D 29/582* (2013.01); *F15B 21/042* (2013.01); *F15B 2211/50536* (2013.01); *F15B 2211/611* (2013.01); *F15B 2211/62* (2013.01)

(58) Field of Classification Search
CPC ..... B64C 27/64; B64C 27/605; B64C 27/615; B64C 27/625; F15B 21/042; F15B 2211/45; F15B 2211/46; F15B 2211/465; F15B 2211/41527; F15B 2211/4159; F15B 2211/40561; F15B 2211/40515
See application file for complete search history.

(56) References Cited

U.S. PATENT DOCUMENTS

| | | | | |
|---|---|---|---|---|
| 2,980,188 A * | 4/1961 | Allen, Jr. | ............... | B64C 11/385 416/46 |
| 3,160,172 A * | 12/1964 | Smith | ................. | F15B 15/1485 137/504 |
| 3,995,717 A * | 12/1976 | Kroffke | ................... | F16N 7/385 184/7.4 |
| 4,750,862 A * | 6/1988 | Barnes | .................... | B64C 11/30 416/157 R |
| 8,985,278 B2 * | 3/2015 | Xu | ........................ | F01D 25/18 184/6.11 |
| 9,169,783 B2 | 10/2015 | Kleckler | | |
| 2005/0135929 A1 | 6/2005 | Waddleton | | |
| 2013/0280065 A1 | 10/2013 | Danielson et al. | | |
| 2013/0323050 A1 * | 12/2013 | Kleckler | ................... | F02C 9/58 416/1 |
| 2014/0050561 A1 | 2/2014 | Homeyer et al. | | |
| 2015/0354697 A1 | 12/2015 | Kinch | | |

OTHER PUBLICATIONS

Trinkel, Bud; accessed Jun. 8, 2016; Chapter 9: Relief and Unloading Pressure Controls, figure 9-9 and Chapter 9 Excerpt; http://www.hydraulicspneumatics.com/other-technologies/chapter-9-relief-and-unloading-pressure-controls.*

Trinkel, Bud; ; accessed Jun. 11, 2016; Chapter 14: Sequence Valves and Reducing Valves, figure 14-4 and Capter 14 Excerpt; http://www.hydraulicspneumatics.com/other-technologies/chapter-14-sequence-valves-and-reducing-valves.*

Extended European Search Report, European Application No. 17176439.2, dated Nov. 11, 2017.

* cited by examiner

PROPELLER BLADE ANGLE CONTROL SYSTEM

TECHNICAL FIELD

The application relates generally to turboprop gas turbine engines and, more particularly, to oil systems for such turboprop engines.

BACKGROUND

Turboprop gas turbine engines for aircraft which use propellers to provide propulsion have blade angle control systems to control the pitch of the propeller blades. The blade angle control system is actuated by hydraulic fluid which is supplied under pressure by a pump.

The pump used for such systems is sized to meet the largest load requirements of the blade angle control system. The hydraulic fluid flow requirements for these larger loads are significantly higher than the flow requirements of the blade angle control system during steady-state operation. The pump therefore often supplies more fluid to the blade angle control system than is required during steady-state operation. A significant amount of this excess fluid is diverted away from the blade angle control system toward the pump's inlet by a suitable valve. This can result in an undesirable increase in the temperature of the oil supplied to the pump.

SUMMARY

There is accordingly provided an oil system of a turboprop gas turbine engine adapted to drive a propeller of an aircraft, the propeller having a plurality of variable pitch propeller blades, the oil system comprising: an engine oil return system; and a propeller blade angle control circuit, comprising: a propeller control unit controlling a supply of oil output therefrom adapted to be used to modify a pitch angle of the propeller blades; a fixed-displacement pump located upstream of the propeller control unit and providing the supply of oil from the engine oil return system to the propeller control unit; an oil cooling line extending between an outlet of the pump and the engine oil return system to define an oil leakage path leading to the engine oil return system for cooling the oil; and a flow regulator between the pump and the propeller control unit, the flow regulator fluidly connected to the oil cooling line and operable between an open position and a closed position, wherein in the open position the flow regulator directs oil through the oil cooling line along the oil leakage path to the engine oil return system for cooling the oil and in the closed position the flow regulator blocks the oil cooling line and directs oil toward the propeller control unit, in use, to modify the pitch angle of the propeller blades.

There is also provided a method of supplying oil to a propeller blade angle control unit, comprising: pumping the oil at a constant flow rate to the propeller blade angle control unit; and controlling access of the pumped oil to an oil cooling leakage path extending from downstream of pumping the oil to an engine oil return system, including directing the oil along the oil cooling leakage path to the engine oil return system to cool the oil, and blocking access to the oil cooling leakage path to direct the oil toward the propeller blade angle control unit to modify an angle of propeller blades.

There is further provided a propeller blade angle control circuit, comprising: a propeller control unit controlling a supply of oil to modify an angle of propeller blades; a fixed-displacement pump located upstream of the propeller control unit and providing the supply of oil from an engine oil return system to the propeller control unit; an oil cooling line extending between an outlet of the pump and the engine oil return system to define an oil leakage path leading to the engine oil return system for cooling the oil; and a flow regulator between the pump and the propeller control unit, the flow regulator engaging the oil cooling line and operable between an open position directing oil through the oil cooling line along the oil leakage path to the engine oil return system for cooling the oil, and a closed position blocking the oil cooling line and directing oil toward the propeller control unit to modify the angle of the propeller blades.

BRIEF DESCRIPTION OF THE DRAWINGS

Reference is now made to the accompanying figures in which.

DETAILED DESCRIPTION

Figure 1:
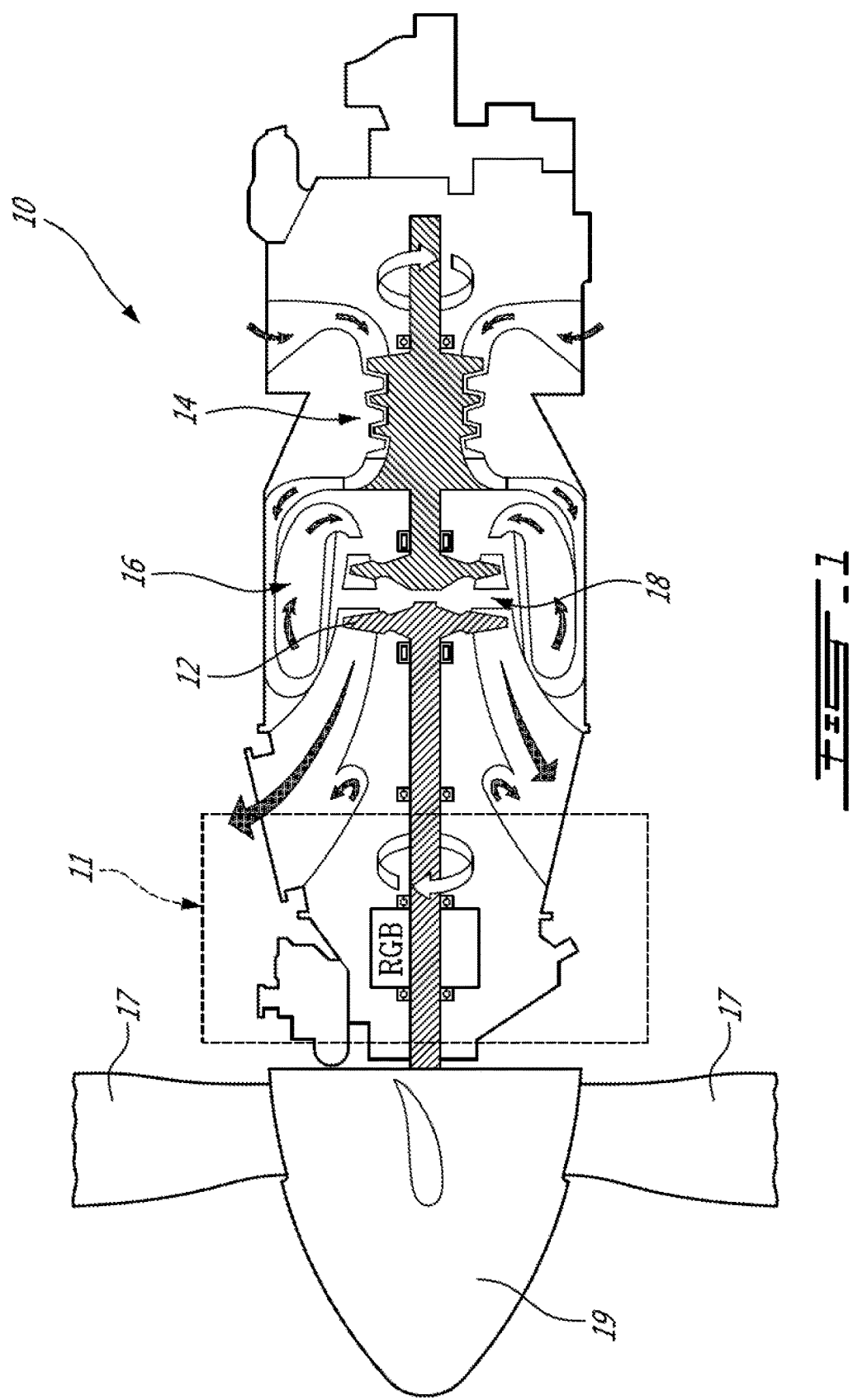
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box (RGB), a propeller 19 having propeller blades 17 for providing thrust to the aircraft. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

Figure 2:
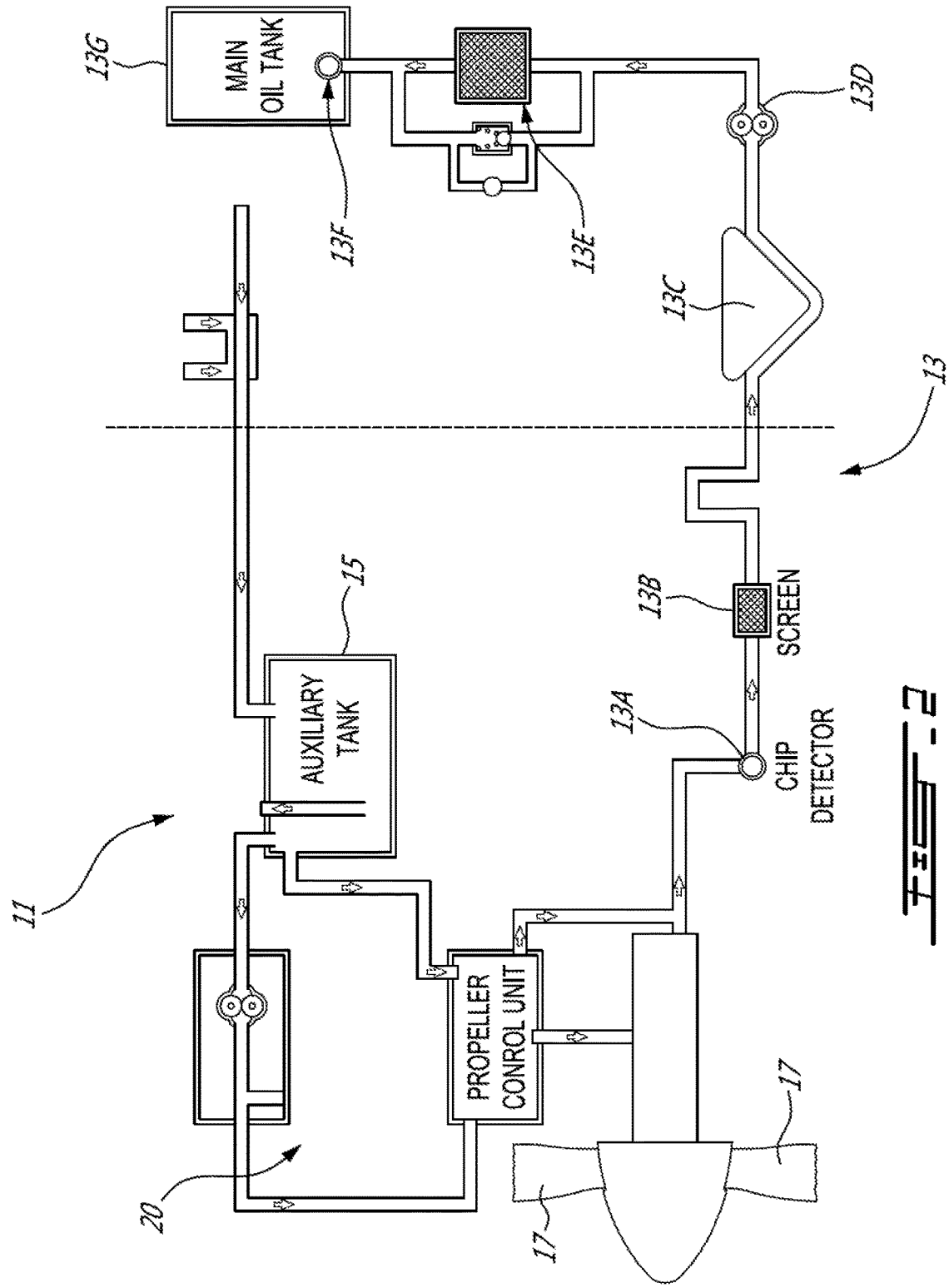
FIG. 2 is a schematic view of an oil system for the gas turbine engine of FIG. 1, the oil system having a propeller blade angle control circuit.

Referring to FIG. 2, the oil system 11 can include any number of components, and any arrangement of components, to provide lubrication to the gas turbine engine 10. One such component, an engine oil return system 13, is shown in the depicted embodiment. The engine oil return system 13 receives used or scavenged oil from the lubricated components of the gas turbine engine, filters and cools the reclaimed oil, and pressurizes it for recirculation to the rotating turbomachinery. In the depicted embodiment, the engine oil return system 13 includes a chip detector 13A to detect the presence of unacceptably-large debris in the oil returning from the propeller 19. The oil and any debris is then filtered with a screen 13B, and then subjected to anti-icing procedures at an anti-icing station 13C. A scavenge pump 13D pressurizes the oil and sends it through another filter 13E before passing through another chip detector 13F before being collected in a main oil tank 13G. From the main oil tank 13G, the oil can be pumped with a supply pump to any number of different components of the oil system 11. For example, oil can be pumped from the supply pump to an auxiliary oil tank 15. The engine oil return system 13 can have more, fewer, and/or different components than those schematically depicted or described above.

In the depicted embodiment, the auxiliary oil tank 15 serves as a source of oil for a propeller blade angle control circuit 20. The oil supplied to the propeller blade angle control circuit 20 (or "control circuit 20") provides hydraulic power to the propeller control circuit 20, allowing it to control the pitch of the variable-pitch propeller blades 17. The control circuit 20 is thus integrated with, and supplied by, the oil system 11. By being integrated with the oil system 11 of the gas turbine engine, the control circuit 20 is able to use the oil provided by oil system 11 to control the pitch of the propeller blades 17. The oil of the oil system 11 therefore provides a lubricating function, and an actuating function by providing hydraulic power.

Figure 3:
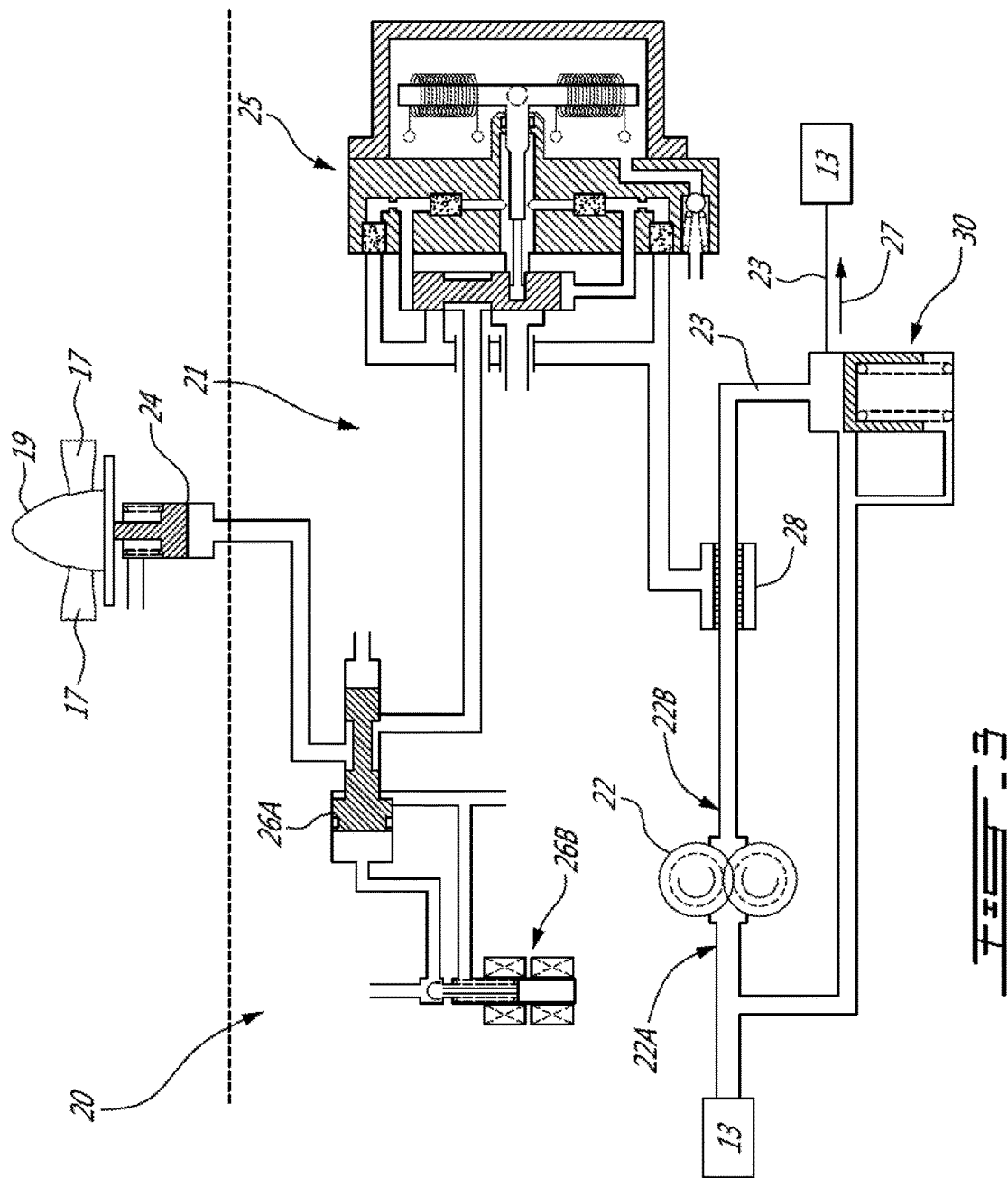
FIG. 3 is a schematic view of the propeller blade angle control circuit of FIG. 2.

The control circuit 20 is an assembly of fluid lines, connectors, valves, and other components that supply oil to the mechanisms that change the pitch of the propeller blades 17. In the embodiment of FIG. 3, the control circuit 20 has a propeller control unit 21 to effect changes in the pitch of the propeller blades 17, a fixed-displacement pump 22 which provides oil to the propeller control unit 21, an oil cooling line 23 which helps to divert excess oil to the engine oil return system 13, and a flow regulator 30 which modulates to the flow of oil.

The propeller control unit 21 modulates the supply of oil that is used to modify the angle of the propeller blades 17. It can thus have any suitable component, and any suitable arrangement of components, to achieve this functionality. More particularly, the propeller control unit 21 may include different actuators, valves, and other components to adjust the angle of the propeller blades 17. In the depicted embodiment, the propeller control unit 21 has a propeller pitch change actuator 24 which can effect fine and coarse changes in propeller blade 17 pitch. The propeller control unit 21 also has a servo valve 25 which controls the pressure of the oil supplied to the pitch change actuator 24. The propeller control unit 21 also has a feather valve 26A supplied with oil by the servo valve 25, and a feather solenoid 26B. The propeller control unit 21 can have more, fewer, and/or different components than those depicted or described above.

The fixed-displacement pump 22 outputs a substantially constant flow rate of oil to the propeller control unit 21. The pump 22 is therefore located within the control circuit 20 upstream of the propeller control unit 21, and acts as a dedicated source of constant hydraulic power. It is typically sized to provide sufficient hydraulic power to satisfy the largest loads of the propeller control unit 21. The pump 22 is supplied with oil from a component of the oil system 11, such as from the engine oil return system 13.

Still referring to FIG. 3, the oil cooling line 23 is a return line which sends excess oil from the pump 22 to the engine oil return system 13. The oil cooling line 23 can therefore be any hose, tube, pipe, or other similar conduit that extends from an outlet 22B of the pump 22 to the engine oil return system 13. It will be appreciated that the oil cooling line 23 may be physically spaced from the outlet 22B of the pump 22 provided that it is fluid communication therewith to receive oil therefrom.

In allowing excess oil to be diverted away from the pump 22 and propeller control unit 21, the oil cooling line 23 defines a leakage path 27 that leads to the engine oil return system 13. "Excess" oil is oil that is supplied by the fixed-displacement pump 22 but that is not required by the propeller control unit 21. Excess oil is typically available during steady-state operation of the propeller 19 (e.g. flight idle, ground idle, etc.), when there is no need to change the pitch of the propeller blades 17. Rather than returning this relatively hot excess oil to an inlet 22A of the pump 22, as is done in some conventional blade angle control systems, the oil cooling line 23 allows the excess oil to be diverted, directly or indirectly, to the engine oil return system 13 where it can be cooled using any of the techniques used to cool the oil being returned from other parts of the oil system 11 (e.g. air-oil heat exchanger, fuel-oil heat exchanger, circulation, etc.). The oil cooling line 23 therefore helps to divert relative hot oil away from the pump 22, thereby reducing the likelihood of damage to the pump 22 caused by overheating. For example, it is known that relative hot oil (i.e. in excess of 275° F.) may exceed the temperature limits of some of the elastomers used in seals for the pump 22, or of the coils in valves of the pump 22.

Still referring to FIG. 3, the flow regulator 30 governs the amount of oil that is leaked along the leakage path 27 to the engine oil return system 13. The flow regulator 30 is located between the pump 22 and the propeller control unit 21. In the depicted embodiment, the flow regulator 30 is shown downstream of the pump 22, downstream of a wash screen 28, and upstream of the servo valve 25 of the propeller control unit 21. Other configurations are possible. The flow regulator 30 is fluidly connected to the oil cooling line 23, and is operable between an open position and a closed position to selectively allow access to or block, respectively, the leakage path 27 defined by the oil cooling line 23 that leads to the engine oil return system 13.

In the open position, the flow regulator 30 allows access to the leakage path 27 and directs oil through the oil cooling line 23 and along the leakage path 27 toward the engine oil return system 13 so that the oil can be cooled. In this position, where oil is diverted along the leakage path 27, the flow regulator 30 is regulating the pressure of the oil supplied to the propeller control unit 21 and diverting excess oil toward the engine oil return system 13. The flow regulator 30 will typically, but not exclusively, operate in the open position during steady-state operation of the propeller 19. During steady-state operation, there is less of a demand from the pitch change actuator 24 responsible for changing the angle of the propeller blades 17. Therefore, "steady-state" refers to relatively little or no demand for hydraulic power from the downstream propeller control unit 21. A cooling oil flow diversion can thus be provided by the flow regulator 30 during steady-state operation.

In the closed position, the flow regulator 30 blocks access to the leakage path 27. Oil is thus instead directed entirely toward the propeller control unit 21 to effect changes in the angle of the propeller blades 17. In this position, where oil is prevented from being diverted along the leakage path 27, substantially all of the hydraulic power supplied by the pump 22 is available for the propeller control unit 21 to make the required changes in propeller blade 17 pitch. This is in contrast to some conventional blade angle control systems, which allow leaking flow back to the engine oil return even during high load manoeuvres. The flow regulator 30 will typically, but not exclusively, operate in the closed position during transient operation of the propeller 19. During transient operation, there is a relatively high demand for hydraulic power. Some examples of transient flow regimes include accommodating for large changes in engine power, moving the engine into or out of reverse, or feathering or unfeathering the propeller 19. Therefore, "transient" refers to relatively high demand for hydraulic power from the downstream propeller control unit 21.

Figure 4A:
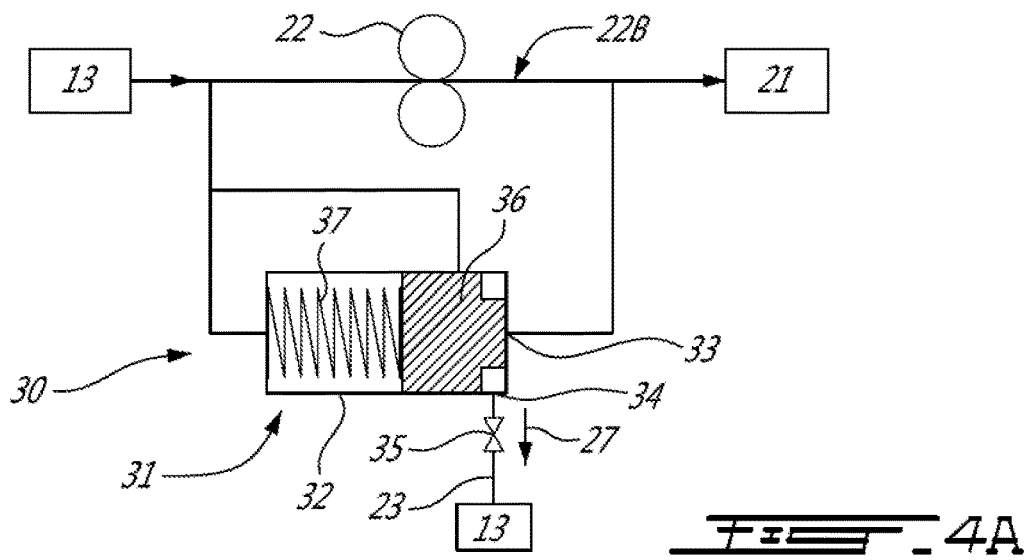
FIG. 4A is a schematic view of a pump and a flow regulator of a propeller blade angle control circuit, according to an embodiment of the present disclosure.
Figure 4B:
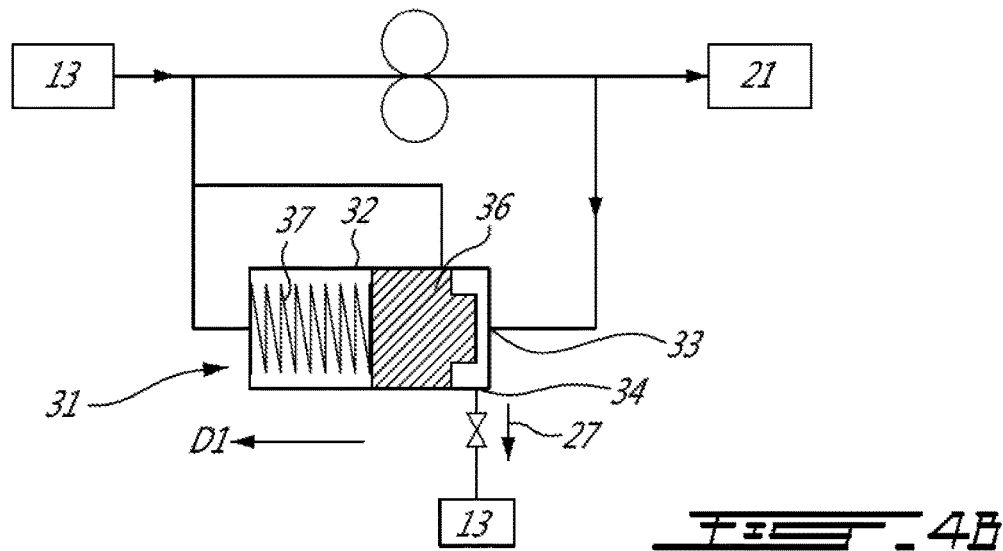
FIG. 4B is another schematic view of the pump and the flow regulator of FIG. 4A.
Figure 4C:
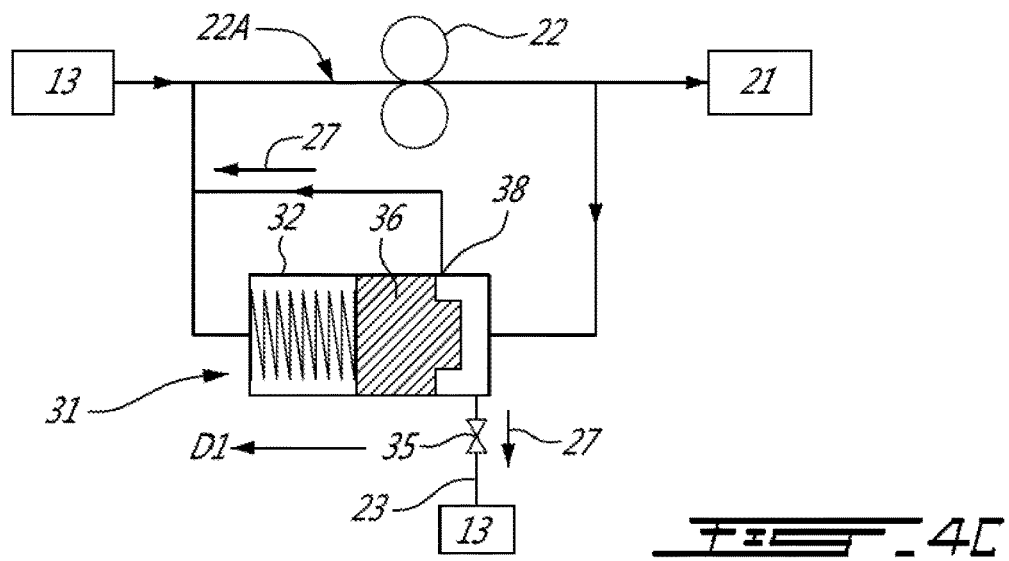
FIG. 4C is yet another schematic view of the pump and the flow regulator of FIG. 4A.

Referring now to FIGS. 4A to 4C, the flow regulator 30 includes a pressure regulator valve 31, or "PRV". The PRV 31 has a housing 32 with an inlet aperture 33. The inlet aperture 33 is in fluid communication with an outlet 22B of the pump 22. This fluid communication can take many forms. In the depicted embodiment, the inlet aperture 33 is an opening in the housing 32 that is at one extremity of a fluid line running from the housing 32 to a location downstream of the outlet 22B of the pump 22. Other configurations are possible. An outlet aperture 34 in the housing 32 is in fluid communication with the engine oil return system 13 via the oil leakage path 27. A restriction 35 may be placed in the oil cooling line 23 leading to the engine oil return system 13 to limit oil flow back to the engine oil return system 13.

The PRV 31 also has a spool 36 within the housing 32 that is displaceable relative to the housing 32. The pressurized oil displaces the spool 36 within the housing 32 so that it blocks and exposes at least the inlet aperture 33. In the depicted embodiment, the spool 36 is not capable of fully blocking the outlet aperture 34 such that oil can always drain to the engine oil return system 13 along the leakage path 27. In other embodiments, the spool 36 can also block and expose the outlet aperture 34. The spool 36 is biased, in this embodiment by a spring 37, to seal against inlet aperture 33. The operation of the PRV 31 is as follows.

In the closed position, as shown in FIG. 4A, the force applied by the pressurized oil at the inlet aperture 33 is less than the biasing force of the spring 37. The spool 36 is therefore biased toward the inlet aperture 33 to block and seal the inlet aperture 33. Oil is therefore prevented from entering into the housing 32 via the inlet aperture 33, and thus prevented from flowing along the leakage path 27 to be cooled. The PRV 31 is thus closed, and is thus not regulating the pressure of the oil supplied to the propeller control unit 21. The PRV 31 operates in this closed position during transient propeller manoeuvers, for example, such as when large propeller blade angle movements are demanded. The leakage path 27 to the engine oil return system 13 is thus closed off.

In the open position, as shown in FIG. 4B, the force applied by the pressurized oil at the inlet aperture 33 exceeds the biasing force of the spring 37. This causes the spool 36 to displace away from the inlet aperture 33 along direction D1. Oil can then enter into the housing 32 via the inlet aperture 33, and exit the housing 32 via the outlet aperture 34 along the leakage path 27 to be cooled. The PRV 31 is thus open, and is regulating the pressure of the oil supplied to the propeller control unit 21. Since the spool 36 has moved off its seat, oil is allowed to flow back to the engine oil return system 13 to be cooled.

Referring to FIG. 4C, the restriction 35 in the oil cooling line 23 may cause the oil cooling line 23 to become saturated such that oil builds up within the housing 32 and exerts additional pressure on the spool 36 to displace it along direction D1. The spool 36 may therefore expose and block a second outlet aperture 38. The second outlet aperture 38 is in fluid communication with the inlet 22A of the pump 22. Once the oil cooling line 23 with the restriction 35 becomes saturated, the spool 36 moves further along direction D1 to open up a second flow back line via the second outlet aperture 38, and oil is directed toward the inlet 22A of the pump 22. In such an embodiment, when the PRV 31 is in the open position, the leakage path 27 leads toward both the engine oil return system 13 and the inlet 22A of the pump 22. The oil is thus able to flow to both destinations simultaneously.

Figure 5A:
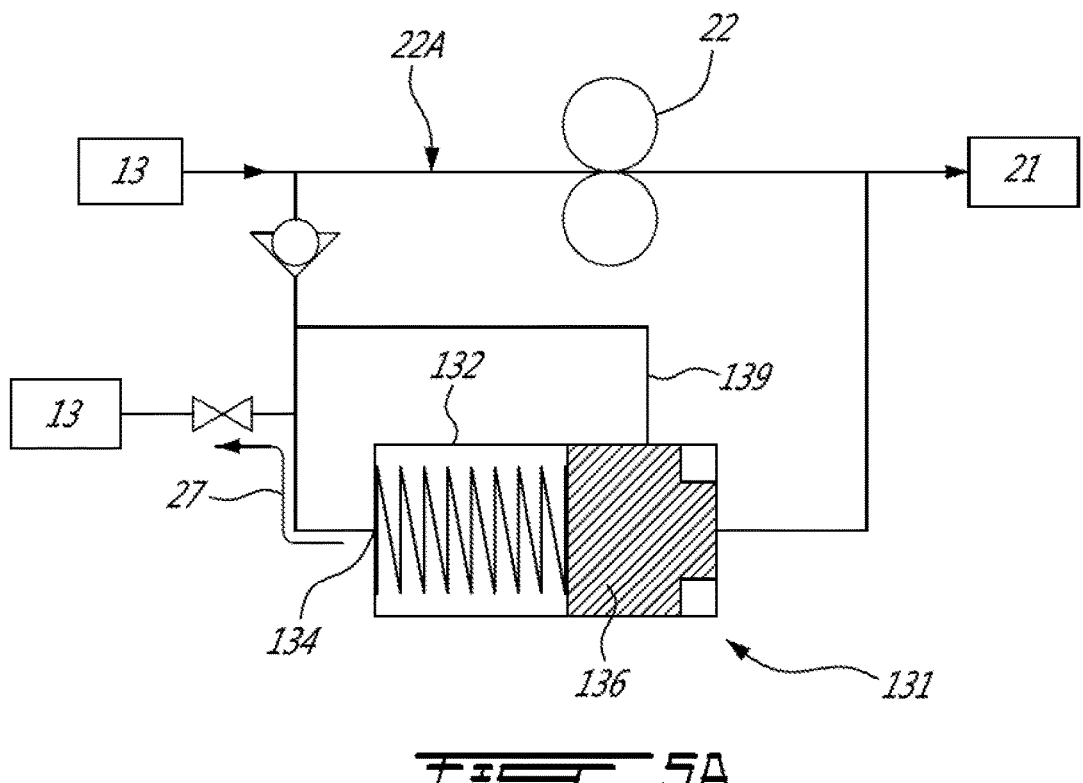
FIG. 5A is a schematic view of a pump and a flow regulator of a propeller blade angle control circuit, according to another embodiment of the present disclosure.
Figure 5B:
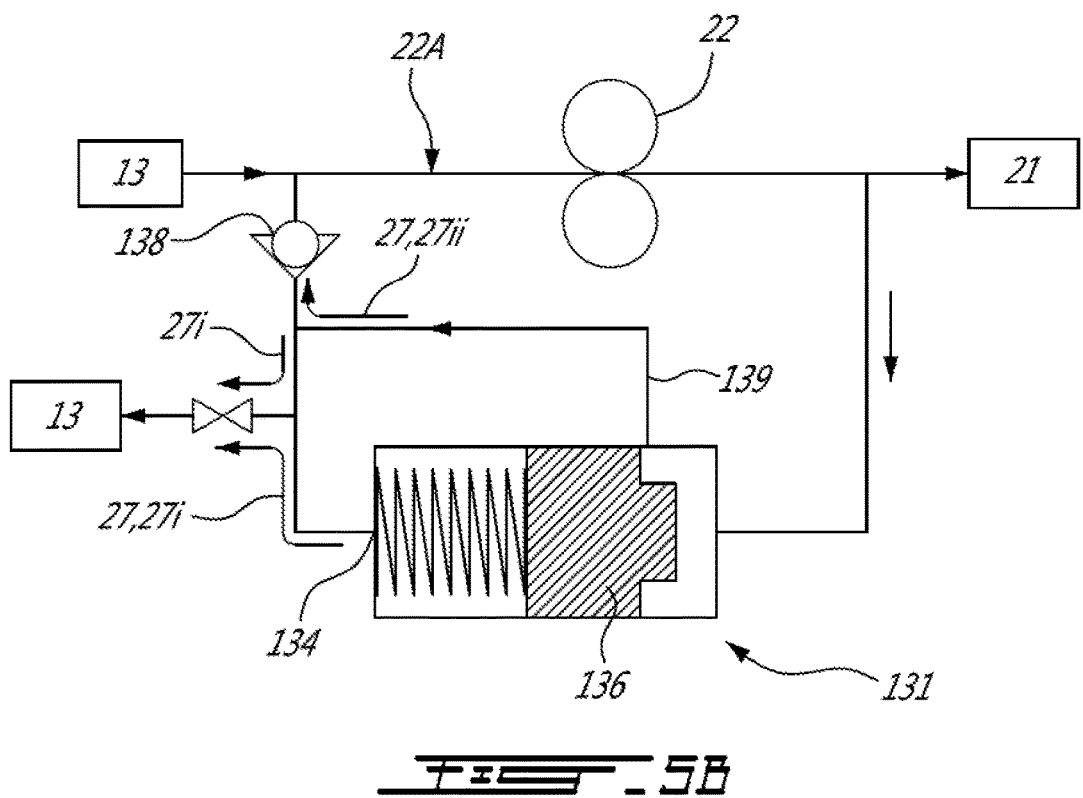
FIG. 5B is another schematic view of the pump and the flow regulator of FIG. 5A.

Another embodiment of the PRV 131 is shown in FIGS. 5A and 5B. The PRV 131 includes a spill return line 139 extending from the housing 132 and in fluid communication with the inlet 22A of the pump 22. The spool 136 of the PRV 131 is displaceable to expose and block the spill return line 139. In the closed position, and as shown in FIG. 5A, the spool 136 blocks the opening in the housing 132 that leads to the spill return line 139, and thus prevents oil from being directed along the spill return line 139 to the inlet 22A of the pump 22. The oil may still be allowed to leak through the spool 136, and out of the housing 132 via the outlet aperture 134 toward the engine oil return system 13 via the oil leakage path 27.

In the open position, and as shown in FIG. 5B, the spool 136 exposes the spill return line 139. This allows the oil to be directed along one or both of the following two leakage paths 27. The first leakage path 27i is defined between the outlet aperture 134 and the engine oil return system 13 so that the oil can be cooled. The second leakage path 27ii is defined along the spill return line 139 toward the inlet 22A of the pump 22. Therefore, in the open position when the PRV 131 is regulating the pressure of oil supplied to the propeller control unit 21, the oil can either flow back to the inlet 22A of the pump 22 or to the engine oil return system 13. Downstream of the junction where the spill return line 139 divides into two leakage paths 27i, 27ii, a check valve 138 may be provided to prevent a reverse flow of oil from the inlet 22A of the pump 22 towards the PRV 131 and down the first leakage path 27i to the engine oil return system 13.

Figure 6A:
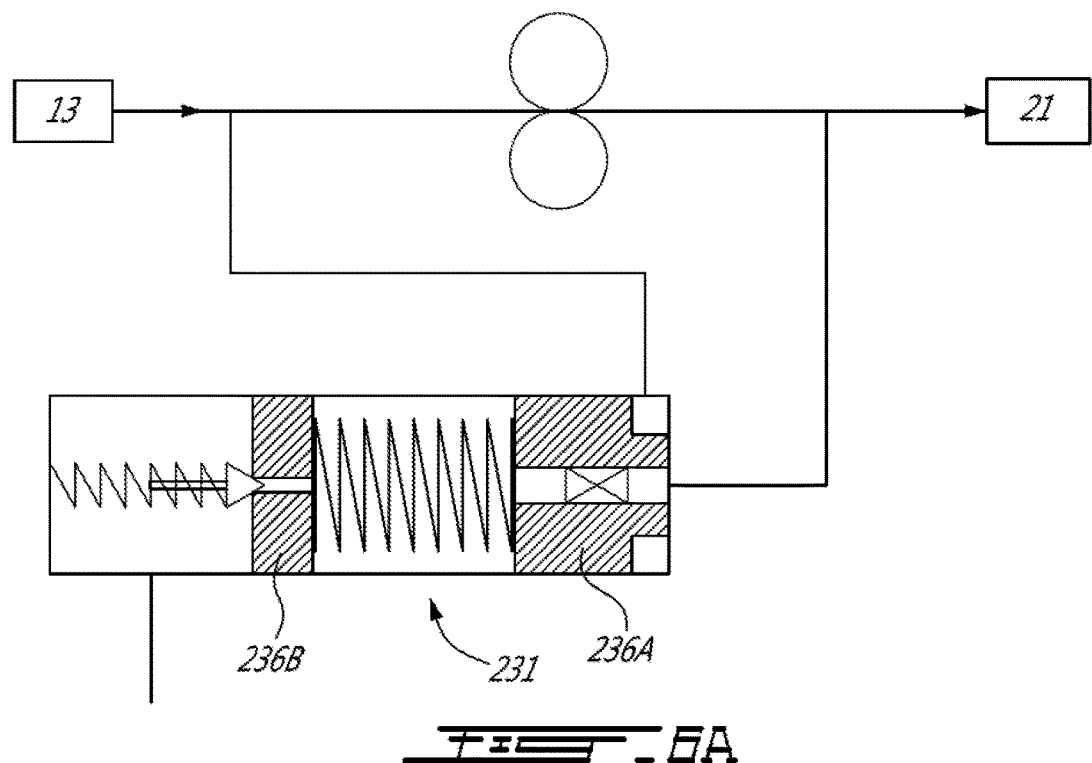
FIG. 6A is a schematic view of a pump and a flow regulator of a propeller blade angle control circuit, according to yet another embodiment of the present disclosure.
Figure 6B:
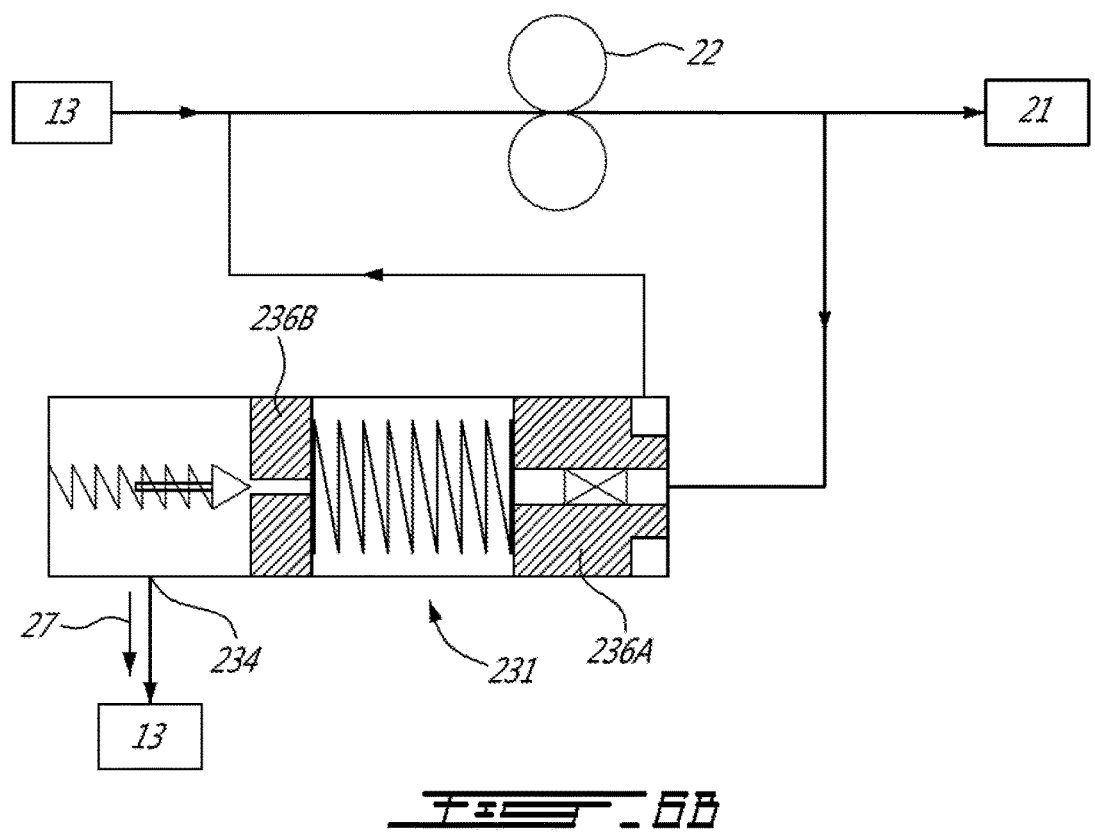
FIG. 6B is another schematic view of the pump and the flow regulator of FIG. 6A.

Another embodiment of the PRV 231 is shown in FIGS. 6A and 6B. The spool 236 of the PRV 231 includes a main spool 236A and a pilot spool 236B being displaceable relative to the main spool 236A. The displacement of the pilot spool 236B relative to the main spool 236A, as shown in FIG. 6B, provides access to the outlet aperture 234 to direct oil through the outlet aperture 234 along the oil leakage path 27 leading to the engine oil return system 13. The PRV 231 is thus a two-stage PRV 231, where the pilot spool 236B stage is fluidly connected to the engine oil return system 13. When the PRV 231 is regulating the pressure, the pilot spool 236B stage flow effectively becomes a cooling circuit for the pump 22. This may help to more accurately regulate the pressure of the oil supplied to the propeller control unit 21.

Referring to FIGS. 4A to 4C, there is also disclosed a method of supplying oil to a propeller blade angle control unit 21. The method includes pumping the oil at a substantially constant flow rate to the propeller blade angle control unit 21, using the pump 22 for example.

The method also includes controlling access of the pumped oil to an oil cooling leakage path 27 extending from downstream of pumping the oil to an engine oil return system 13. The control of access to the oil leakage path 27 includes directing the oil along the oil cooling leakage path 27 to the engine oil return system 13 to cool the oil, and blocking access to the oil cooling leakage path 27 to direct the oil toward the propeller blade angle control unit 21 to modify an angle of propeller blades.

In some conventional blade angle control system, a deliberate, continuous leakage path between the exit of the pump and the engine oil return system is used to maintain an acceptable maximum oil temperature within the pump. However, this continuous leakage path will reduce the rate at which the blade angle control system can effectuate changes in blade angle. In some applications, this reduced blade angle change rate may require using a larger pump, which further exacerbates the problem of hot excess oil being returned to the pump inlet.

In contrast, the propeller blade angle control circuit 20 disclosed herein provides access for the oil to a "controlled" leakage path 27 to the engine oil return system 13. The flow regulator 30 provides access to the leakage path 27 only for as long as there are no downstream demands from the propeller control unit 21 for hydraulic power. When there is a demand for downstream hydraulic power, the flow regulator 30 can relatively quickly close off the leakage path 27 and allow all available oil to be used for the purposes of effecting changes in the angle of the propeller blades 17. The control circuit 20 disclosed herein therefore provides an oil cooling circuit that does not adversely affect the rate at which the blade angle can be changed.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:
1. An oil system for a turboprop gas turbine engine adapted to drive a propeller of an aircraft, the propeller having a plurality of variable pitch propeller blades, the oil system comprising:
   an engine oil return system; and
   a propeller blade angle control circuit, comprising:
      a propeller control unit having a servo valve controlling a supply of oil output therefrom adapted to be used to modify a pitch angle of the propeller blades;
      a fixed-displacement pump located upstream of the propeller control unit and providing the supply of oil from the engine oil return system to the propeller control unit;
      an oil cooling line extending between an outlet of the pump and the engine oil return system to define an oil leakage path leading to the engine oil return system for cooling the oil; and
      a flow regulator between the pump and the servo valve, the flow regulator being fluidly connected to the oil cooling line and operable between an open position and a closed position, wherein in the open position the flow regulator directs oil through the oil cooling line along the oil leakage path to the engine oil return system for cooling the oil and in the closed position the flow regulator blocks the oil cooling line and directs oil toward the propeller control unit, in use, to modify the pitch angle of the propeller blades.

2. The oil system as defined in claim 1, wherein the flow regulator operates in the closed position during transient operation of the propeller control unit.

3. The oil system as defined in claim 1, wherein the flow regulator operates in the open position during steady-state operation of the propeller control unit.

4. The oil system as defined in claim 1, wherein the flow regulator includes a pressure regulator valve having a housing with an inlet aperture in fluid communication with the outlet of the pump and an outlet aperture in fluid communication with the oil leakage path leading to the engine oil return system, the pressure regulator valve having a spool disposed within the housing and displaceable relative to the housing to block and expose the inlet aperture.

5. The oil system as defined in claim 4, wherein the spool exposes the inlet aperture in the open position to direct oil through the outlet aperture along the oil leakage path leading to the engine oil return system.

6. The oil system as defined in claim 4, wherein the spool blocks the inlet aperture in the closed position to restrict access to the oil leakage path.

7. The oil system as defined in claim 4, wherein the housing includes a second outlet aperture in fluid communication with an inlet of the pump, the spool being displaceable to expose and block the second outlet aperture.

8. The oil system as defined in claim 4, wherein the pressure regulator valve includes a spill return line extending from the housing and in fluid communication with an inlet of the pump, the spool being displaceable to expose and block the spill return line, the spool exposing the spill return line in the open position to direct oil along the oil leakage path leading to the engine oil return system or toward the inlet of the pump.

9. The oil system as defined in claim 8, further comprising a check valve between the inlet of the pump and the spill return line, the check valve preventing oil from flowing from the inlet of the pump to the oil leakage path.

10. The oil system as defined in claim 4, wherein the spool includes a main spool and a pilot spool being displaceable relative to the main spool, the displacement of the pilot spool relative to the main spool providing access to the outlet aperture to direct oil through the outlet aperture along the oil leakage path leading to the engine oil return system.

11. A method of supplying oil to a propeller blade angle control unit, comprising:
   pumping the oil at a constant flow rate to the propeller blade angle control unit; and
   controlling access of the pumped oil to an oil cooling leakage path extending from downstream of pumping the oil to an engine oil return system and upstream of a servo valve, including directing the oil along the oil cooling leakage path to the engine oil return system to cool the oil, and blocking access to the oil cooling leakage path to direct the oil toward the propeller blade angle control unit to modify an angle of propeller blades.

12. The method as defined in claim 11, wherein blocking access to the oil cooling leakage path includes blocking access to the oil cooling leakage path during transient operation of the propeller blade angle control unit.

13. The method as defined in claim 11, wherein directing the oil along the oil cooling leakage path includes directing the oil along the oil cooling leakage path during steady-state operation of the propeller blade angle control unit.

14. The method as defined in claim 11, wherein directing the oil along the oil cooling leakage path includes directing some of the oil upstream of pumping the oil.

15. The method as defined in claim 11, further comprising preventing oil upstream of pumping the oil from flowing along the oil cooling leakage path.

16. A propeller blade angle control circuit, comprising:
a propeller control unit having a servo valve controlling a supply of oil to modify an angle of propeller blades;
a fixed-displacement pump located upstream of the propeller control unit and providing the supply of oil from an engine oil return system to the propeller control unit;
an oil cooling line extending between an outlet of the pump and the engine oil return system to define an oil leakage path leading to the engine oil return system for cooling the oil; and
a flow regulator between the pump and the servo valve, the flow regulator engaging the oil cooling line and operable between an open position directing oil through the oil cooling line along the oil leakage path to the engine oil return system for cooling the oil, and a closed position blocking the oil cooling line and directing oil toward the propeller control unit to modify the angle of the propeller blades.

17. The circuit as defined in claim 16, wherein the flow regulator operates in the closed position during transient operation of the propeller control unit, and wherein the flow regulator operates in the open position during steady-state operation of the propeller control unit.

18. The circuit as defined in claim 16, wherein the flow regulator includes a pressure regulator valve having a housing with an inlet aperture in fluid communication with the outlet of the pump and an outlet aperture in fluid communication with the oil leakage path leading to the engine oil return system, the pressure regulator valve having a spool disposed within the housing and displaceable relative to the housing to block and expose the inlet aperture.

19. The circuit as defined in claim 18, wherein the spool exposes the inlet aperture in the open position to direct oil through the outlet aperture along the oil leakage path leading to the engine oil return system, and wherein the spool blocks the inlet aperture in the closed position to restrict access to the oil leakage path.

20. The circuit as defined in claim 18, wherein the pressure regulator valve includes a spill return line extending from the housing and in fluid communication with an inlet of the pump, the spool being displaceable to expose and block the spill return line, the spool exposing the spill return line in the open position to direct oil along the oil leakage path leading to the engine oil return system or toward the inlet of the pump.

* * * * *